United States Patent
Odaka et al.

(10) Patent No.: US 6,699,411 B2
(45) Date of Patent: Mar. 2, 2004

(54) METHOD FOR PRODUCING HIGH PURITY SILICON CARBIDE SINTERED BODY

(75) Inventors: Fumio Odaka, Niiza (JP); Kazuhiro Ushita, Kodaira (JP); Yoshitomo Takahashi, Fujisawa (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/941,676

(22) Filed: Aug. 30, 2001

(65) Prior Publication Data

US 2002/0070485 A1 Jun. 13, 2002

Related U.S. Application Data

(62) Division of application No. 09/610,260, filed on Jul. 5, 2000, now abandoned.

(30) Foreign Application Priority Data

Jul. 9, 1999 (JP) ............................................ 11-195708

(51) Int. Cl.[7] .............................................. C01B 31/00
(52) U.S. Cl. .................... 264/29.7; 264/29.1; 264/29.6; 264/625
(58) Field of Search ................................ 264/625, 29.1, 264/29.6, 29.7

(56) References Cited

U.S. PATENT DOCUMENTS 4,284,431 A * 8/1981 Ohno et al. .................... 75/212
5,589,116 A * 12/1996 Kojima et al. ................. 264/65
6,187,704 B1    2/2001 Takahashi et al.
6,217,969 B1 *  4/2001 Takahashi et al. .......... 428/64.1
6,228,293 B1 *  5/2001 Kriegsmann et al. ...... 264/29.7

FOREIGN PATENT DOCUMENTS

| JP | A-61-6110 | 1/1986 |
| JP | A-5-24818 | 2/1993 |
| JP | A-10-67565 | 3/1998 |

* cited by examiner

Primary Examiner—Christopher A. Fiorilla
(74) Attorney, Agent, or Firm—Oliff & Berridge, PLC

(57) ABSTRACT

It is an object of the present invention to provide a method for simply producing a high purity silicon carbide sintered body having no remaining metal silicon and excellent heat resistance. A method for producing a silicon carbide sintered body of the present invention comprises the steps of: preparing a slurry by dispersing silicon carbide powder in a solvent; forming a molded body by pouring the slurry into a mold and effecting calcination for the slurry in a vacuum atmosphere or in an inert gas atmosphere; and sealing pores within the calcined molded body by impregnating the pores with high purity metal silicon molten by heating, and allowing the high purity metal silicon and carbon contained in the molded body to react on each other in the pores so as to produce silicon carbide.

7 Claims, No Drawings

METHOD FOR PRODUCING HIGH PURITY SILICON CARBIDE SINTERED BODY

This application is a divisional of 09/610,260 filed Jul. 5, 2000, now abandoned.

BACKGROUND OF THE INVENTION

1. Field of the Invention

The present invention relates to a silicon carbide sintered body having excellent heat resistance and of high purity, which silicon carbide sintered body is advantageously used as a component for a semiconductor manufacturing apparatus or electronic information equipment, or as a structural component of a vacuum device or the like, and also relates to a method for producing the same.

2. Description of the Related Art

Silicon carbide has conventionally been remarked as a material which can be used at high temperatures for the reason that is has excellent strength, heat resistance, thermal shock resistance, and wear resistance even at high temperatures higher than 1000° C. Recently, a sintered body of silicon carbide has been used as an alternative material of quartz used as a jig for manufacturing a semiconductor.

As a method for producing a sintered body of silicon carbide as described above, a reaction sintering process is known. In this reaction sintering process, first, silicon carbide powder and carbon powder are dissolved and dispersed in a solvent and mixed particles in a slurry form are produced. The produced mixed particles are poured into a casting mold, an extrusion mold, or a press mold, and then dried, to thereby obtain a non-sintered molded body (green body). The obtained green body is heated in a vacuum atmosphere or in an inert gas atmosphere, and thereafter is immersed in molten metal silicon so as to allow free carbon in the green body and the molten metal silicon drawn up into the green body due to capillary phenomena. Thus, a sintered body of silicon carbide is obtained.

A sintered body of silicon carbide which is used for a jig for manufacturing a semiconductor, or the like is required to have a high purity. However, under the existing circumstances, it is difficult to obtain a high purity silicon carbide sintered body.

In order to produce a high purity silicon carbide sintered body, for example, there have been proposed the following methods. One is a method in which an $SiO_2$ film is formed on a surface of a sintered body of silicon carbide and impurity elements are confined in the $SiO_2$ film, and thereafter, the $SiO_2$ film is dissolved and removed by using an acid such as hydrofluoric acid, to thereby obtain a high purity silicon carbide sintered body. Another is a method in which a green body is calcined at 2000° C. or thereabouts in a vacuum before it is impregnated with molten metal silicon so as to remove impurity elements, to thereby obtain a high purity silicon carbide sintered body.

However, the former method has a problem in that an oxidizing furnace dedicated for forming the $SiO_2$ film, and processing equipment for handling the acid are required. Further, the latter process has a problem in that the number of steps increases. On the other hand, there has also been known a method in which the surface of the silicon carbide sintered body is coated by using chemical vapor deposition (CVD). However, this method has a problem in that the number of steps increases and production costs also increase, and many impurity elements may be contained in an obtained sintered body. There is a possibility that the silicon carbide sintered bodies obtained by these methods may contain unreacted metal silicon remaining therein depending on an Si/C ratio. In this case, there arises an important problem in that the silicon carbide sintered body can merely be used only at a melting point (1420° C.) or less of the remaining metal silicon.

Accordingly, there is still further considered a method in which a slurry containing a predetermined amount of carbon powder added to and mixed with silicon carbide powder is produced for the purpose of preventing the metal silicon from remaining in the silicon carbide sintered body and controlling the Si/C ratio. However, in this case, the specific gravity of both powders and respective grain sizes are greatly different from each other, and therefore, it is difficult to produce a homogeneous slurry. Therefore, it is also considered that an amount of dispersion medium or an amount of a surface active agent is increased. However, if the amount of dispersion medium is increased, production of a green body having high density becomes difficult. If the amount of a surface active agent is increased, impurity elements resulting from the surface active agent may increase.

Accordingly, an object of the present invention is to solve the above-described various problems in the conventional methods and to provide a high purity silicon carbide sintered body having excellent heat resistance, and a method for producing the silicon carbide sintered body in a simplified manner.

SUMMARY OF THE INVENTION

The present inventors have earnestly studied and found the mechanism of producing a high purity silicon carbide sintered body by using, as a raw material, a carbon generating substance in a liquid form. The present invention has been devised in view of the aforementioned.

A method for producing a silicon carbide sintered body comprises the steps of: preparing a slurry by dispersing silicon carbide powder in a solvent; forming a molded body by pouring the slurry into a mold and effecting calcination for the slurry in a vacuum atmosphere or in an inert gas atmosphere; and sealing pores within the calcined molded body by impregnating the pores with high purity metal silicon molten by heating, and allowing the high purity metal silicon and carbon contained in the molded body to react on each other in the pores so as to produce silicon carbide.

A silicon carbide sintered body of the present invention is produced by the above-described method for producing a silicon carbide sintered body according to the present invention. In the silicon carbide sintered body of the present invention obtained by the method for producing a silicon carbide sintered body, the content of impurities such as metal is extremely low and the silicon carbide sintered body is of high purity and has a density of 2.90 g/cm$^3$ or more, and is further excellent in heat resistance.

DESCRIPTION OF THE PREFERRED EMBODIMENTS

A method for producing a silicon carbide sintered body according to the present invention comprises a slurry preparing step, a molded body forming step, a calcination step, and a pore sealing step. The method for producing a silicon carbide sintered body according to the present invention is referred to as a so-called reaction sintering process.

Slurry Preparing Step:

In the slurry preparing step, a slurry is prepared by dispersing is silicon carbide powder in a solvent.

Silicon Carbide Powder:

The silicon carbide powder is obtained, for example, by dissolving, in a solvent, a silicon source containing at least one kind of silicon compound, a carbon source containing at least one kind of organic compound which generates carbon upon heating, and a polymerization or cross-linking catalyst, and drying the mixture, and thereafter, firing the obtained powder in a non-oxidizing atmosphere.

The silicon carbide powder may be α-type, β-type, amorphous type, or a mixture thereof. The grade of the β-type silicon carbide powder is not particularly limited and a commercially available β-type silicon carbide powder may be used. When a high purity silicon carbide sintered body is obtained in the present invention, high purity silicon carbide power is preferably used as a raw material of the sintered body.

It is preferable that the grain size of the silicon carbide powder be smaller from the standpoint of achieving high density. Specifically, the grain size is preferably in the range from 0.01 to 10 $\mu$m, and more preferably in the range from 0.05 to 5 $\mu$m.

If the grain size is smaller than 0.01$\mu$m, handling in processes such as measuring, mixing, and the like is apt to become difficult. Further, if the grain size is greater than 10 $\mu$m, the specific surface area thereof is small, namely, the contact area of adjacent particles becomes small, thereby making it difficult to achieve high density. Either case is not preferable.

A high purity silicon carbide powder is obtained, for example, by dissolving, in a solvent, a silicon source containing at least one kind of silicon compound, a carbon source containing at least one kind of organic compound which generates carbon upon heating, and a polymerization or cross-linking catalyst, and drying the mixture, and thereafter, firing the obtained powder in a non-oxidizing atmosphere.

A liquid silicon source and a solid silicon source can be used together, but at least one kind of silicon source needs be selected from a group consisting of liquid silicon sources.

Examples of liquid silicon sources include alkoxysilane (mono-, di-, tri-, tetra-) and polymers of tetraalkoxysilane.

Among alkoxysilanes, tetraalkoxysilane is preferably used. More specifically, methoxysilane, ethoxysilane, propoxysilane, butoxysilane, and the like can be used. However, among these, ethoxysilane is particularly preferably used from the standpoint of handling.

Preferable examples of the polymers of tetraalkoxysilane include low molecular weight polymers (oligomers) having a degree of polymerization of 2 to 15, and liquid polymers of silicic acid having high degrees of polymerization.

A preferable example of solid silicon sources is silicon oxide. The silicon oxide in the reaction sintering process may, be silicon monoxide (SiO), may be silica sol (a colloidal ultra-fine silica containing solution, which contains an OH or alkoxyl group therein), or may be silicon dioxide (silica gel, fine silica, quartz powder).

The above-described silicon sources may be used singly or may be used in combination of two or more.

Among these silicon sources, an oligomer of tetraethoxysilane, or a mixture of an oligomer of tetraethoxysilane and an ultra-fine powder of silica is suitably used from the standpoints of homogeneity and handling.

The silicon sources used herein are preferably high purity substances and preferably contain impurities in an amount of 20 ppm or less, and more preferably 5 ppm or less, at an initial stage.

The carbon sources may be used singly in a liquid form or may be a mixture of liquid and solid forms.

Preferably, the carbon source may be an organic compound having a high residual carbon ratio and polymerized or cross-linked by means of a catalytic action or heating. Examples of such organic compounds include monomers and prepolymers of phenol resin, furan resin, and other resins such as polyimide, polyurethane, and polyvinyl alcohol. Moreover, liquid compounds of cellulose, sucrose, pitch, tar, and the like can also be used. Among these, a resol-type phenol resin is particularly preferable.

The carbon sources may be used singly or may be used in combination of two or more.

The purity of the organic compound used as the carbon source can be controlled and selected appropriately in accordance with the purposes. However, when silicon carbide powder of high purity is required, an organic compound which contains metals each in an amount of 5 ppm or less is preferably used.

The above-described polymerization or cross-linking catalyst can be selected appropriately in accordance with the carbon source. When the carbon source is phenol resin or furan resin, the catalyst may be an acid such as toluene sulfonic acid, toluene carboxylic acid, acetic acid, oxalic acid, or hydrochloric acid. Among these, toluene sulfonic acid is particularly preferable.

The ratio between carbon contained in the carbon source and silicon contained in the silicon source (which will be hereinafter abbreviated as "C/Si ratio") is defined by means of elemental analysis of a carbide intermediate obtained by carbonizing the mixture at 1,000° C. Stoichiometrically, when the C/Si ratio is 3.0, there would be 0% free carbon in the produced silicon carbide. However, free carbon is actually generated at a lower C/ Si ratio due to vaporization of the SiO gas generated simultaneously. It is preferable to determine the mixing ratio in advance so that the amount of free carbon in the produced silicon carbide powder becomes adequate for the purpose of producing a sintered body. In the case of firing at around 1 atm and at 1600° C. or higher, generation of free carbon can normally be inhibited at a C/Si ratio of 2.0 to 2.5. Accordingly, this range can be advantageously used. When the C/Si ratio becomes higher than 2.5, the amount of free carbon increases remarkably. However, the free carbon has the effect of inhibiting the growth of grains, and therefore, the C/Si ratio may be appropriately selected in accordance with the purpose of grain formation. On the other hand, when firing is carried out at in an atmosphere of low pressure or high pressure, the C/Si ratio for obtaining pure silicon carbide will vary. In this case, the C/Si ratio is not necessarily limited to the above-described range.

The above-described powder is obtained by dissolving, in a solvent, the silicon source, the carbon source, and polymerization or cross-linking catalyst, and drying the mixture, and is also obtained, for example, by curing a mixture of the silicon source and the carbon source.

The curing process may be carried out, for example, by means of cross-linking upon heating, by means of curing with a curing catalyst, or by means of an electron or radioactive beam.

The curing catalyst may be selected appropriately in accordance with the type of the carbon source. When the carbon source is a phenol resin or a furan resin, the curing catalyst may be an acid such as toluene sulfonic acid, toluene carboxylic acid, acetic acid, oxalic acid, hydrochloric acid, sulfuric acid, or maleic acid, or an amine such as hexamine. When the curing catalyst is used, the curing catalyst is dissolved and dispersed in a solvent. The solvent may be a lower alcohol such as ethyl alcohol, or may be ethyl ether, or may be acetone.

The powder is heated to be carbonized.

The carbonization by heating is achieved by heating the powder in a non-oxidizing atmosphere of nitrogen or argon or the like at a temperature of 800° C. to 1,000° C. for 30 to 120 minutes.

The above-described powder is carbonized by heating to form a carbide and is further fired in a non-oxidizing atmosphere of argon or the like at a temperature in the range from 1,350° C. to 2,000° C., to thereby produce silicon carbide powder.

The firing temperature and time may be appropriately selected in accordance with a grain size or the like of silicon carbide powder to be obtained, and for more effective production of silicon carbide, it is preferable that the firing be carried out at a temperature in the range from 1,600° C. to 1,900° C.

Further, in order to remove the impurities and produce silicon carbide powder of much higher purity, heating treatment is preferably carried out for 5 to 20 minutes at a temperature in the range from 2,000° C. to 2,100° C. after the above-described firing.

As a method for producing silicon carbide powder of particularly high purity, there is provided a method for producing a monocrystal, which is described in Japanese Patent Application Laid-Open (JP-A) No. 9-48605 filed by the present applicant, to produce a raw material powder. Namely, this is a process for making silicon carbide powder of high purity, which comprises a silicon carbide powder producing step for producing silicon carbide powder by heating and firing in a non-oxidizing atmosphere a homogenous mixture of a silicon source comprising at least one selected from tetraalkoxysilane, polymers of tetraalkoxysilane, and silicon oxide, each of which should be of high quality, and a carbon source comprising, an organic compound of high purity that generates carbon upon heating; and a post-treatment step in which heat treatment with the obtained silicon carbide powder being basically kept at a temperature from equal to or higher than 1,700° C. to lower than 2,000° C. and being heated at a temperature between 2,000° and 2,100° C. for 5 to 20 minutes is carried out at least once during the step. The obtained silicon carbide powder of high purity has an impurity element content of 0.5 ppm or less.

The size of the obtained silicon carbide powder is not homogeneous, and therefore, is pulverized or classified so as to form powder of a desired grain size.

In order that a silicon carbide sintered body using the silicon carbide powder has conductivity, nitrogen can be introduced. In a case in which nitrogen is introduced when the silicon carbide powder is produced, first, the silicon source, the carbon source, an organic substance consisting of a nitrogen source, and the polymerization or cross-linking catalyst are mixed homogeneously. At this time, for example, when a carbon source such as a phenol resin, an organic substance consisting of a nitrogen source such as hexamethylenetetramine, a polymerization or cross-linking catalyst such as toluene sulfonic acid are dissolved in a solvent such as ethanol, these compounds are preferably mixed sufficiently with a silicon source such as an oligomer of tetraethoxysilane.

The organic substance consisting of a nitrogen source is preferably a substance which generates nitrogen upon heating. For example, various amines such as polymer compounds (specifically, polyimide resin, a nylon resin, and the like) and organic amines. (specifically, hexamethylenetetramine, ammonia, triethylamine, and compounds and salts thereof) are used. Among these substances, hexamethylenetetramine is preferable. Further, a phenol resin which is synthesized using hexamine as a catalyst and contains 2.0 mmol or more of nitrogen derived from the synthesization for 1 g of resin, can also be appropriately used as the organic substance consisting of a nitrogen source. The organic substance consisting of a nitrogen source may be used singly or may be used in combination of two or more.

In a case in which the organic substance consisting of a nitrogen source is added simultaneously with the silicon source and the carbon source, the amount of-addition of the organic substance is set such that a content of nitrogen for 1 g of the silicon source is preferably 1 mmol or more, more preferably 80 to 1000 $\mu$g.

Slurry:

The slurry is prepared by dispersing silicon carbide powder in a solvent.

When the silicon carbide powder is dispersed in the solvent in a state of being sufficiently stirred and mixed, pores formed in a non-sintered molded body (green body) can homogeneously be dispersed, which is preferable.

Examples of the solvent include water, lower alcohols such as ethyl alcohol, ethyl ether, acetone, and the like.

When the slurry is prepared, an organic binder, a defoaming agent, and the like may be added.

Examples of the organic binder include a deflocculating agent, a powder adhesive, and the like.

The deflocculating agent is preferably a nitrogen based compound from the standpoint of further improving an effect of imparting conductivity. For example, ammonia, polyacrylic ammonium salt, and the like are appropriately used.

Preferable examples of the powder adhesive include polyvinyl alcohol, an urethane resin (for example, water soluble polyurethane), and the like.

Examples of the defoaming agent include a silicone based defoamer, and the like.

Further, nitrogen can be introduced for the purpose of imparting conductivity to a silicon carbide sintered body using the silicon carbide powder. In a case in which nitrogen is introduced in preparation of the slurry, first, the silicon carbide powder and the organic substance consisting of a nitrogen source may merely be mixed homogeneously. Preferably, the organic substance consisting of a nitrogen source such as hexamethylenetetramine is dissolved and dispersed in a solvent such as water, ethyl alcohol, or the like, and thereafter, the silicon carbide powder is sufficiently mixed therewith by stirring.

The organic substance consisting of a nitrogen source is as described above. In a case in which the organic substance consisting of a nitrogen source is added simultaneously with the silicon carbide powder and an organic substance consisting of at least one kind of carbon source, an amount of addition of the organic substance consisting of a nitrogen source is set such that a nitrogen content for 1 g of the silicon carbide powder is preferably 0.7 mmol or more, more preferably 200 to 2000 $\mu$g, and most preferably 1500 to 2000 $\mu$g.

The stirring and mixing carried out in preparation of the slurry can be carried out by using a generally known stirring/mixing means, for example, a mixer, a planetary ball mill. The stirring/mixing time is approximately 10 to 30 hours, and preferably 16 to 24 hours.

Molded Body Forming Step:

In the molded body forming step, the slurry is poured into a mold and calcined in a vacuum atmosphere or in an inert gas atmosphere, to thereby forming a molded body.

A process for pouring the slurry into a mold may preferably be a casting process.

It is preferable that before the calcination, the slurry is kept standing still and the mold is removed therefrom, and further heated to be dried at 50 to 60° C. or dried by air so as to remove the solvent.

The calcination temperature is preferably in the range from 1500 to 1900° C. The molded body (green body) is obtained by the calcination. The molded body (green body) is a non-sintered body and many pores are formed in an interior thereof.

Calcination Step:

In the calcination step, the molded body, after having been impregnated with an organic substance consisting of at least one kind of carbon source, is calcined.

The above-described organic substance consists of a carbon source, namely, a substance which generates carbon upon heating, preferably, an organic compound which generates carbon upon heating. The organic substance may be used singly or may be used in combination of two or more.

The above-described organic compound which generates carbon upon heating may be, preferably, a compound having conductivity. Examples of such organic compounds include coal-tar pitch, pitch tar, phenol resin, furan resin, epoxy resin, phenoxy resin, and various saccharides including monosaccharides such as glucose, oligosaccharides such as sucrose, and polysaccharides such as cellulose and starch, each having a high residual carbon ratio.

In order to facilitate the impregnation, there are suitably used organic substances which are in the liquid form at room temperature, organic substances which are dissolved into solvents, or organic substances which soften or liquefy upon heating such as thermoplastic or thermomelting materials. Among these substances, phenol resin is preferable used, and resol type phenol resin is particularly preferable from the standpoint of improving the strength of a molded body obtained by being impregnated with the organic substance.

An amount of the organic substance impregnated in the molded body is preferably a carbon content of 10 to 30%, more preferably a carbon content of 12 to 20%.

If the carbon content is less than 10%, carbon is insufficient when metal silicon is converted into silicon carbide (SiC) in the pore sealing step, and unreacted metal silicon (Si) remains in pores. Therefore, the heat resistance is not sufficiently obtained and the conductivity which can be imparted if desired is difficult to obtain. If the carbon content is greater than 30%, there is a possibility that the molded body be broken due to its expansion caused by thermal decomposition during the calcination. Either case is not preferable.

It is necessary that the calcination be carried out in a vacuum atmosphere or in an inert gas atmosphere so that the carbon generated from the organic substance is passed to reaction sintering in the subsequent pore sealing step without being burned.

Due to calcinations, the strength of the molded body increases and the stability thereof improves, and therefore, metal silicon heated to be molten is easily introduced into pores within the molded body. Further, carbon generated from the organic substance covers silicon carbide formed on the surface of the pores in the molded body, and therefore, reaction between the carbon and the metal silicon heated to molten and impregnated in the pores is carred out easily and homogeneously. Further, a portion of impunties is removed from the molded body and the purity of the molded body also improves.

Pore Sealing Step:

In the pore sealing step, the pores within the molded body having been subjected to the calcination are impregnated with high purity metal silicon heated to be molten, and in the pores, the high purity metal silicon and carbon contained in the molded body are reacted against each other so as to produce silicon carbide, by which the pores are sealed.

It is necessary that the temperature at which the high purity metal silicon is heated to be molten be a melting point or more of the high purity metal silicon, preferably 1450 to 1700° C., and more preferably 1550 to 1650° C.

If the temperature is less than 1450° C., the viscosity of the high purity metal silicon increases, and therefore, the metal silicon is hard to be impregnated in the molded body due to capillary phenomena. If the temperature is higher than 1700° C., evaporation occurs excessively and a furnace body or the like may be damaged.

The grain shape of the high purity metal silicon may be powdered, granular, or a solid. A solid metal silicon having a grain size of 2 to 5 mm is preferably used. In the present invention, the term "high purity" means a case in which an impurity content is less than 1 ppm.

The above-described impregnation is preferably carried out in a vacuum atmosphere or in an inert gas atmosphere. The impregnation is carried out utilizing capillary phenomena in such a state that the molded body is immersed in the heated and molten high purity metal silicon. Namely, the high purity metal silicon is drawn up into the pores within the molded body. In the pores, the metal silicon and free carbons within the molded body react against each other so as to produce silicon carbide. At this time, carbon produced by the thermal decomposition of the organic substance in a liquid form exists, on the surface of the pores, homogeneously in a molecular size, and therefore, a conversion ratio of the carbon and the metal silicon (Si) to silicon carbide is high. The pores are filled with and sealed by the silicon carbide thus produced. The reaction between the metal silicon and the carbon occurs approximately at 1420 to 2000° C., and therefore, the high purity metal silicon heated to be molten at 1450 to 1700° C. reacts on free carbon within the molded body at a stage in which the metal silicon is impregnated into the molded body.

It suffices that the above-described impregnation process be effected in such a manner that the molded body is immersed in the heated and molten metal silicon. In this case, it is not necessary that the molded body be entirely immersed in the metal silicon, and it suffices that the molded body be partially immersed therein due to the reason that the metal silicon sequentially penetrates into the pores within the molded body due to capillary phenomena.

The time for the impregnation, namely, the time in which the molded body is immersed in the metal silicon is not particularly limited and can be appropriately determined in accordance with the size or shape of the molded body, a carbon content in the molded body, or the like.

In the pore sealing step, the pores within the molded body are filled with and sealed by metal silicon, and the molded body itself is subjected to reaction sintering, to thereby obtain a complete silicon carbide sintered body. The obtained silicon carbide sintered body is formed such that a remaining amount of metal silicon is extremely small, and has high density, excellent heat resistance, and high purity. So long as the molded body has nitrogen introduced therein, the silicon carbide sintered body to be obtained has good conductivity. The good conductivity is obtained if a nitrogen content in the silicon carbide sintered body is 150 ppm or more, and preferably 200 ppm or more. The nitrogen is preferably contained in the silicon carbide sintered body in a dissolved state from the standpoint of stability.

In the silicon carbide sintered body of the present invention thus obtained, a total amount of impurity elements contained therein is preferably less than 10 ppm, and more preferably less than 5 ppm. The content of the impurity elements is an impurity content based on chemical analysis and is merely indicated as a reference value, Practically, evaluations vary depending on whether the impurity elements are homogeneously distributed in the silicon carbide sintered body or locally dispersed. The term "impurity element" used herein means group 1 to group 16 elements in the periodic table of the 1989 revised version of IUPAC Inorganic Chemistry Nomenclature that have an atomic number of three or greater, except for a carbon atom, a nitrogen atom, and a silicon atom.

In the method for preparing a silicon carbide sintered body of the present invention, a heating furnace, a reactor, and the like appropriately selected from devices which can be used in generally known reaction sintering processes can be used.

The silicon carbide sintered body of the present invention obtained by the method for producing a silicon carbide sintered body of the present invention may be appropriately subjected to processing, polishing, washing, and the like in accordance with the purposes. For example, the silicon carbide sintered body can appropriately be used as a component for manufacturing a semiconductor or a component for electronic information equipment by effecting electric discharging therefor.

EXAMPLES

A description will be given of examples of the present invention, but it is to be understood that the present invention is not limited to the same.

Example 1

1000 g of silicon carbide powder, that is, high purity silicon carbide powder having a central grain size of 1.1 µm (which is silicon carbide having an impurity content of 5 ppm or less and produced in accordance with a production method disclosed in Japanese Patent Application Laid-Open (JP-A) No. 9-48605: containing 1.5% by weight of silica) was placed in 400 g of water in which 10 g of ammonium polyacrylate as a deflocculating agent is dissolved, and dispersed and mixed by a ball mill for six hours. Subsequently, added to the resulting mixture were 30 g of water soluble polyurethane (manufactured by Sanyo Chemical Industries, Ltd., trade name: U-COAT) as a powder additive and 1 g of silicone defoaming agent (manufactured by Shin-Etsu Chemical Co., Ltd., trade name: KM72A), and further dispersed and mixed by a ball mill for ten minutes, to thereby prepare a slurry having a viscosity of 3 poise.

The obtained slurry was cast into a plaster mold of 100 mm (length), 50 mm (width), and 5mm (thickness), and dried by air for 24 hours (at 22° C.) and then calcined at 1800° C. for 0.2 hours, to thereby form a molded body.

Next, the molded body was immersed in a phenol resin (manufactured by Sumitomo Metal Chemical Co., Ltd.), which is an organic substance consisting of a carbon source. The immersion was carried out while causing ultrasonic vibration. Subsequently, the molded body was calcined in an argon atmosphere at 1800° C. for 0.2 hours and dried at 120° C., to thereby obtain a molded body having carbon.

Still further, the molded body was immersed in high purity metal silicon powder (manufactured by Kojundo Chemical Laboratory Co., Ltd.) molten by being heated to 1550° C. in an argon atmosphere, in a graphite crucible of which inner diameter is 200 mm and height is 80 mm, and maintained for 30 minutes so as to allow carbon of the molded body and the molten metal silicon penetrating into the molded body due to capillary phenomena to react on each other, to thereby produce silicon carbide. The produced silicon carbide was filled in the pores within the molded body and a silicon carbide sintered body of example 1 was produced.

Comparative Example 1

A slurry of comparative example 1 was prepared as in example 1 except that 127 g of carbon black powder was used in place of the organic substance consisting of a carbon source. However, a homogeneous slurry cannot be produced, and therefore, 3 g of a deflocculating agent and 100 g of water were further added to thereby w prepare a slurry. Subsequently, in the same manner as in example 1, a silicon carbide sintered body of comparative example 1 was produced.

Evaluation

In each of the obtained silicon carbide sintered bodies of example 1 and comparative example 1, the following evaluations, namely, measurements of density and porosity using a method using the Archimedian principle and a strength test were conducted. Further, an amount of impurities was measured. The results are given in Table 1 below.

Measurement of Density and Porosity Using a Method Using the Archimedian Principle:

The measurements of density and porosity of each silicon carbide sintered body was conducted in accordance with JIS-R1634.

Strength Test:

Each silicon carbide sintered body was cut into a sample of which length is 50 mm, width is 5 mm, and thickness is 5 mm, and side surfaces of the cut sample were each polished and a three-point bending strength test was conducted (span: 40, cross head speed (mm/min)).

Measurement of Impurities:

The side surfaces of a sample of the silicon carbide sintered body was washed with a mixed acid (hydrofluoric acid/nitric acid/sulfuric acid=5/2/3), and thereafter, the sample was decomposed with the same mixed acid. The decomposition was conducted twice and a decomposition liquid at the third decomposition process was used as a sample and each of elements was analyzed by ICP-MS.

TABLE 1

|  | Example 1 | Comparative Example 1 |
|---|---|---|
| Bending strength (Mpa) | 492 | 315 |
| Density (g/cm$^3$) | 2.99 | 2.87 |
| Porosity (%) | ≈0 | 2.1 |
| Content of impurities (ppm) | | |
| B | 0.21 | 0.93 |
| Al | 0.01 | 0.02 |
| K | 0.03 | 0.28 |
| Ca | 0.01 | 0.01 |
| Cr | 0.00 | 0.00 |
| Fe | 0.16 | 1.59 |
| Ni | 0.02 | 0.26 |

As is apparent from Table 1, in the silicon carbide sintered body of example 1, satisfactory results are obtained for all of the above-described evaluations. The silicon carbide sintered body of the present invention is excellent in heat resistance and has high purity, and according to the method for producing the silicon carbide sintered body of the present invention, the silicon carbide sintered body of the present invention having the above-mentioned excellent characteristics can easily be produced.

What is claimed is:

1. A method for producing a high-purity silicon carbide sintered body, comprising:

preparing a slurry by dispersing silicon carbide powder in a solvent;

forming a molded body by pouring the slurry into a mold;

impregnating the molded body with an organic substance comprising at least one kind of carbon source;

effecting calcination of the slurry in a vacuum atmosphere or in an inert gas atnosphere; and sealing pores within the calcined molded body by impregnating the pores with high purity metal silicon molten by heating, and allowing the high purity metal silicon and carbon contained in the molded body to react on each other in the pores so as to produce silicon carbide wherein the silicon carbide powder is obtained by a process for preparing silicon carbide powder, comprising:

producing silicon carbide powder by homogeneously mixing a silicon source comprising at least one selected from tetraalkoxysilane and polymers of tetraalkoxysilane, each of high purity, and a carbon source comprising an organic compound of high purity which generates carbon upon heating, and heating and firing the mixture in a non-oxidizing atmosphere; and effecting post-treatment in which the obtained silicon carbide powder is kept at a temperature from equal to or higher than 1,700° C. to lower than 2,000° C. and carrying out heat treatment at a temperature between 2,000° C. and 2,100° C. for 5 to 20 minutes at least once.

2. The method for producing a silicon carbide sintered body according to claim 1, wherein an average grain size of the silicon carbide powder is 0.01 to 10 $\mu$m.

3. The method for producing a silicon carbide sintered body according to claim 1, wherein the silicon source is a polymer of tetraalkoxysilane and the carbon source is a phenol resin.

4. The method for producing a silicon carbide sintered body according to claim 1, wherein the silicon carbide powder includes impurity elements of which each content is 0.5 ppm or less.

5. The method for producing a silicon carbide sintered body according to claim 1, wherein the step of calcination is carried out at temperature from 1500 to 1900° C.

6. The method for producing a silicon carbide sintered body according to claim 1, wherein the carbon content of the organic substance impregnated in the molded body during the calcination is 10 to 30 wt %.

7. The method for producing a silicon carbide sintered body according to claim 1, wherein a substance that forms a nitrogen source is added during one of preparing the slurry and forming the molded body.

* * * * *